United States Patent
Hughes (10) Patent No.: US 10,578,231 B2
(45) Date of Patent: Mar. 3, 2020

(54) PLASTIC CABLE MANAGEMENT DESIGN FOR RETAINING WIRE BUNDLES IN AEROSPACE APPLICATIONS

(71) Applicant: GE Aviation Systems Limited, Cheltenham, Gloucestershire (GB)

(72) Inventor: Lewis Hughes, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 15/860,704

(22) Filed: Jan. 3, 2018

(65) Prior Publication Data

US 2018/0216753 A1 Aug. 2, 2018

(51) Int. Cl.
*F16L 3/10* (2006.01)
*F16L 3/23* (2006.01)
*H02G 3/32* (2006.01)

(52) U.S. Cl.
CPC ...... *F16L 3/10* (2013.01); *F16L 3/23* (2013.01); *H02G 3/32* (2013.01)

(58) Field of Classification Search
CPC ... F16L 3/10; F16L 3/23; F16L 3/1091; F16L 3/22; F16L 3/2235; F16L 3/227; F16L 3/221; F16L 3/1025; F16L 3/1008; H02G 3/32; H02G 3/30; H02G 3/08; H02G 3/00
USPC .......................................... 248/68.1, 49–74.5
See application file for complete search history.

(56) References Cited

U.S. PATENT DOCUMENTS

| | | | | |
|---|---|---|---|---|
| 2,884,214 A * | 4/1959 | Wrobel | ............... | F16L 3/1236 248/74.3 |
| 3,188,030 A * | 6/1965 | Fischer | ............... | F16L 3/10 248/68.1 |
| 4,660,790 A * | 4/1987 | Muz | ............... | F16L 3/2235 174/156 |
| 6,516,498 B2 * | 2/2003 | LaCoy | ............... | F16L 3/1025 24/16 R |
| 7,223,918 B2 * | 5/2007 | Gelibert | ............... | F16L 3/227 174/481 |
| 8,157,222 B1 | 4/2012 | Shirey et al. | | |
| 8,352,072 B2 | 1/2013 | Gal et al. | | |
| 8,534,614 B2 * | 9/2013 | Guthke | ............... | H02G 3/32 248/65 |
| 8,609,986 B2 | 12/2013 | Edmond | | |
| 2005/0006535 A1 * | 1/2005 | Brown | ............... | F16L 3/10 248/70 |
| 2006/0169850 A1 * | 8/2006 | Wunderlich | ............... | F16L 3/22 248/68.1 |
| 2008/0098571 A1 | 5/2008 | Morris | | |

(Continued)

FOREIGN PATENT DOCUMENTS

| | | |
|---|---|---|
| CN | 105240620 A | 1/2016 |
| CN | 205070329 U | 3/2016 |
| WO | 2017/046570 A1 | 3/2017 |

OTHER PUBLICATIONS

Combined Search and Examination Report issued in connection with corresponding GB Application No. 1701628.8 dated Aug. 1, 2017.

*Primary Examiner* — Christopher Garft
(74) *Attorney, Agent, or Firm* — McGarry Bair, P.C.

(57) ABSTRACT

A beneficial cable retaining assembly provides for size adjustment to accommodate cable bundles of various diameters for avionics wiring, and allows for a set of cables to be secured without the use of a cable tie. The cable retaining assembly comprises a bracket having channels and a clip configured to slide within the channels.

18 Claims, 7 Drawing Sheets

(56) References Cited

U.S. PATENT DOCUMENTS

| | | |
|---|---|---|
| 2011/0198465 A1 | 8/2011 | Blanchard et al. |
| 2012/0037765 A1 | 2/2012 | Guthke et al. |
| 2012/0217354 A1 | 8/2012 | Walraven et al. |
| 2014/0027584 A1 | 1/2014 | Pauchet et al. |
| 2015/0219246 A1* | 8/2015 | Sauerhoefer .......... F16L 3/1091 415/214.1 |
| 2015/0226354 A1 | 8/2015 | Reed et al. |
| 2017/0242460 A1* | 8/2017 | Mitsuishi ................. H02G 3/30 |

* cited by examiner

PLASTIC CABLE MANAGEMENT DESIGN FOR RETAINING WIRE BUNDLES IN AEROSPACE APPLICATIONS

BACKGROUND OF THE INVENTION

Contemporary aircrafts use avionics in order to control the various equipment and operations for flying the aircraft. The avionics can include electronic components that are connected by a wiring system for transmitting electrical energy. Such wiring systems are one factor associated with flight safety and thus clamps must be suitable with respect to size, type, and material. Furthermore, it is important when adding wiring to an existing wire bundle to evaluate the existing clamp sizing in order to avoid possible clamp pinching, and in some cases it may be necessary to increase the size of the clamps to accommodate the new wiring.

BRIEF DESCRIPTION OF THE INVENTION

In one aspect, the present disclosure relates to a cable retaining assembly, comprising a bracket having a body with a first support face and first and second channels with at least one of the first or second channels including a ratcheting strip therein, a clip having a body with a second support face and a set of protrusions configured to slide within the set of channels and wherein the set of protrusions include ratcheting teeth. The ratcheting strip and ratcheting teeth form a ratchet locking mechanism configured to engage the clip with the bracket and when the clip is engaged with the bracket the first support face and the second support face define a raceway configured to retain a set of cables.

In another aspect, the present disclosure relates to a cable retaining assembly, comprising a set of cable retaining bodies, with a cable retaining body, comprising a bracket having a body with a first support face and first and second channels with the first and second channels including a ratcheting strip therein, a clip having a body with a second support face and a set of protrusions configured to slide within the set of channels and wherein the set of protrusions include ratcheting teeth. The ratcheting strip and ratcheting teeth form a ratchet locking mechanism configured to engage the clip with the bracket and when the clip is engaged with the bracket the first support face and the second support face define a cable raceway configured to retain a set of cables, wherein the cable retaining body is modular and the set of cable retaining bodies are operably coupled.

In yet another aspect, the present disclosure relates to a cable retaining assembly, comprising a bracket having a body with a first side and a second side and a first curved support face extending between at least a portion of the first side and the second side and where the first side includes first and second channels with the first and second channels including ratcheting strips a clip having a second curved support face and a set of spaced protrusions configured to slide within the set of channels and having teeth configured to engage with the ratcheting strips. When the set of spaced protrusions are located within the first and second channels two locking points are formed and a cable raceway is formed between the first support face and the second support face and where the clip is configured to be reusably engaged with bracket multiple times.

DETAILED DESCRIPTION OF THE INVENTION

Figure 1:
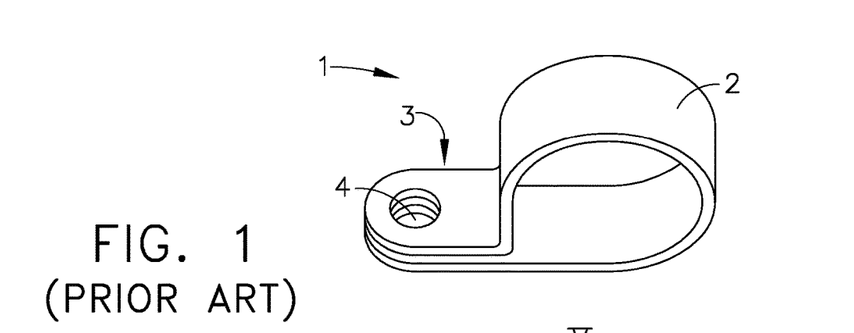
FIG. 1 is a perspective view of a prior art clip.

On aircraft, the electrical wiring provides electrical energy to avionics of the aircraft. Clamps are commonly used to route the wiring. A common type of clamp known in the prior art is a P-clip. FIG. 1 illustrates a prior art clamp in the form of a P-clamp or P-clip 1. The P-clip 1 includes a loop strap 2, a mounting flange 3, and a mounting opening 4. The diameter of the loop-strap 2 is fixed. The P-clip 1 can be mounted to a surface. To mount the P-clip 1 to the surface, the mounting flange 3 abuts the surface and a fastener, such as a rivet or screw, can be inserted into the mounting opening 4 to secure the mounting flange 3 to the surface. As seen in FIG. 1, the prior art P-clip 1 is not size adjustable. Aspects of the disclosure describe a beneficial cable retaining assembly that provides for size adjustment to accommodate cable bundles of various diameters allowing for adding wires to cable looms during maintenance periods.

While "a set of" various elements will be described, it will be understood that "a set" can include any number of the respective elements, including only one element. Additionally, all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary.

Figure 2:
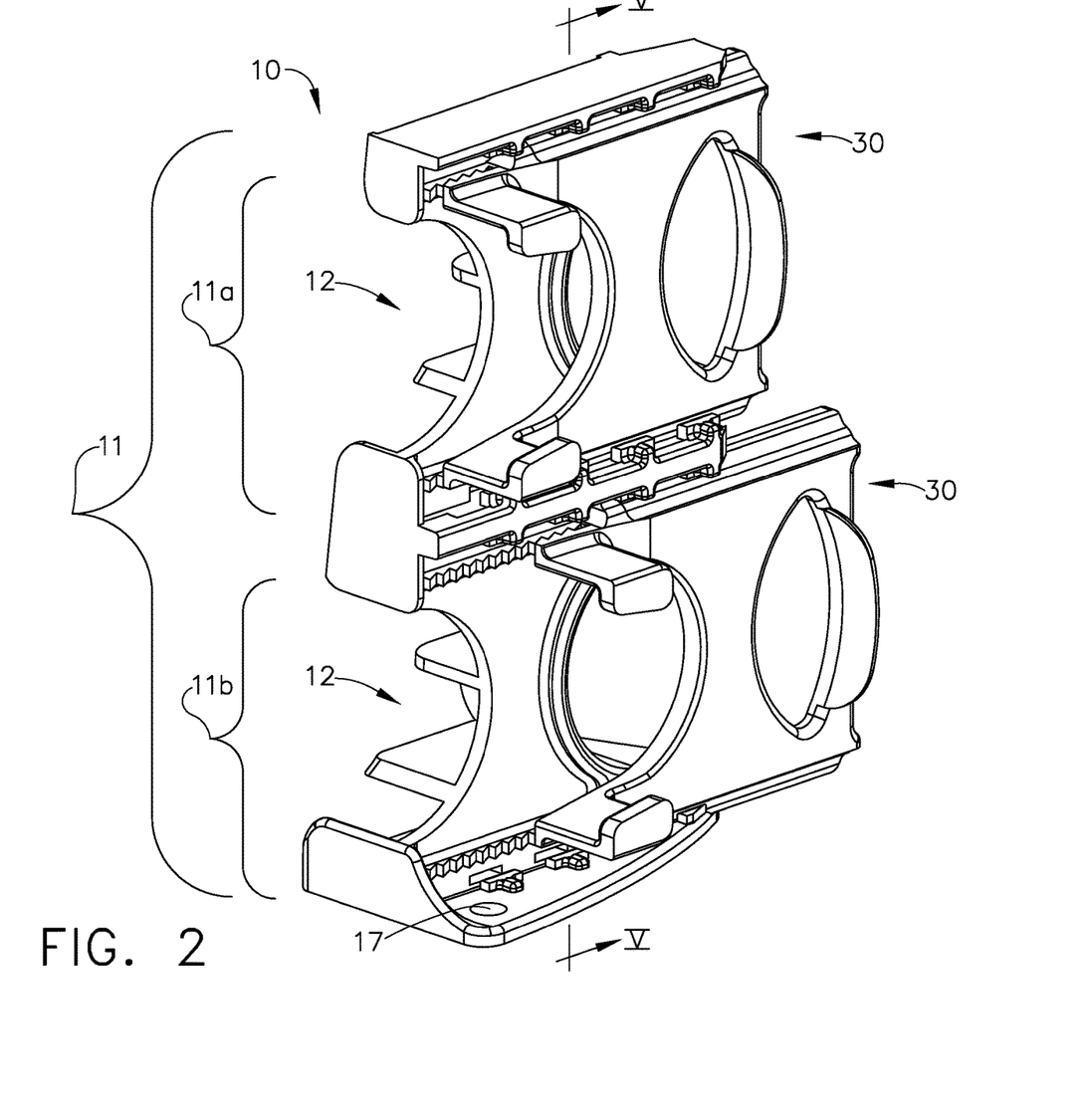
FIG. 2 is a perspective view of an exemplary cable retaining assembly in accordance with various aspects described herein.

FIG. 2 illustrates an exemplary cable retaining assembly 10 according to aspects of the present disclosure. The cable retaining assembly 10 can include a set of cable retaining bodies 11 where the cable retaining body 11 includes a bracket 12 and a clip 30. The bracket 12 and clip 30 can be made of any suitable temperature rated materials including, but not limited to, high performance thermoplastics.

The bracket 12 can have a mounting opening 17 to accommodate a fastener for securing the cable retaining assembly 10 to a surface (not shown). The set of cable retaining bodies 11 can be modular wherein the cable retaining bodies 11 are operably coupled to other cable retaining bodies 11 in the set. By way of non-limiting example, a lower portion of a first bracket 12 is operably coupled to an upper portion of a second bracket 12. The brackets 12 can be operably coupled in any suitable manner including, but not limited to, ultrasonic welding.

Figure 3:
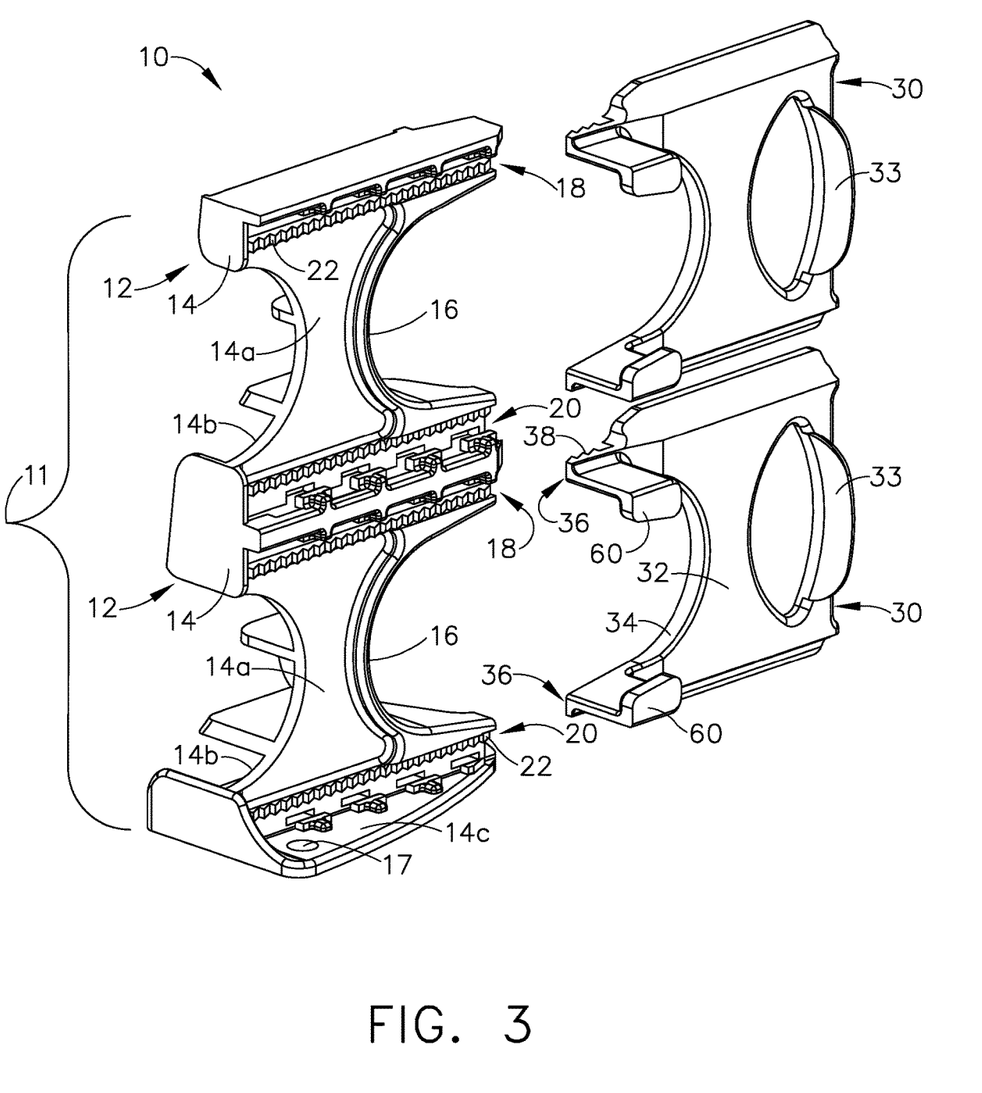
FIG. 3 is an exploded perspective view of the cable retaining assembly shown in FIG. 2.

FIG. 3 is an exploded view more clearly showing portions of the bracket 12 and clip 30 of the cable retaining bodies 11. A body 14 with a first side 14a and a second side 14b can form a portion of the bracket 12. A first support face 16 can be curved and extend between at least a portion of the first side 14a and at least a portion of the second side 14b. The first support face 16 is illustrated as extending along the vertical length of the body 14. It will be understood that alternatively, the first support face 16 may extend along only a portion of the vertical length. An extended lower portion 14c can be perpendicular to the vertical length of the body 14, which can enable the bracket 12 to stand upright from a surface when mounted.

The first side 14a can include a set of first and second channels 18 and 20, respectively that are illustrated as being located on opposite ends of the bracket 12. The first channel 18 is illustrated as being above first support face 16 and the second channel 20 is illustrated as being below the first support face 16 although the channels can be arranged differently and at alternative locations. A ratcheting strip 22 can be included in both the first and second channels 18 and 20. The ratcheting strip 22 is illustrated as extending the length of the first and second channels 18 and 20, although it will be understood that this need not be the case.

The clip 30 can have a body 32 including a projection 33 that can be generally perpendicular to the body 32 and a second support face 34, which can also be curved similarly to the first support face 16. A set of fins 44 can be disposed on opposite ends of the body 32. The fins 44 can taper from the body 32 such that distal end of the fins 44 can have less depth than the body 32. A set of protrusions 36 can be provided on the body 32 and spaced apart such that the protrusions 36 are configured to slide within the first and second channels 18 and 20. Ratcheting teeth 38 can be included on the set of protrusions 36. The shape of the ratcheting teeth 38 can correspond to the shape, profile, or geometry of the ratcheting strip 22. A set of tabs 60 can also be included on the clip 30. In the illustrated example, a tab 60 is adjacent each of the protrusions 36 and includes an elongated portion 62 with a curved portion 64 disposed at the end of the elongated portion 62.

Figure 4:
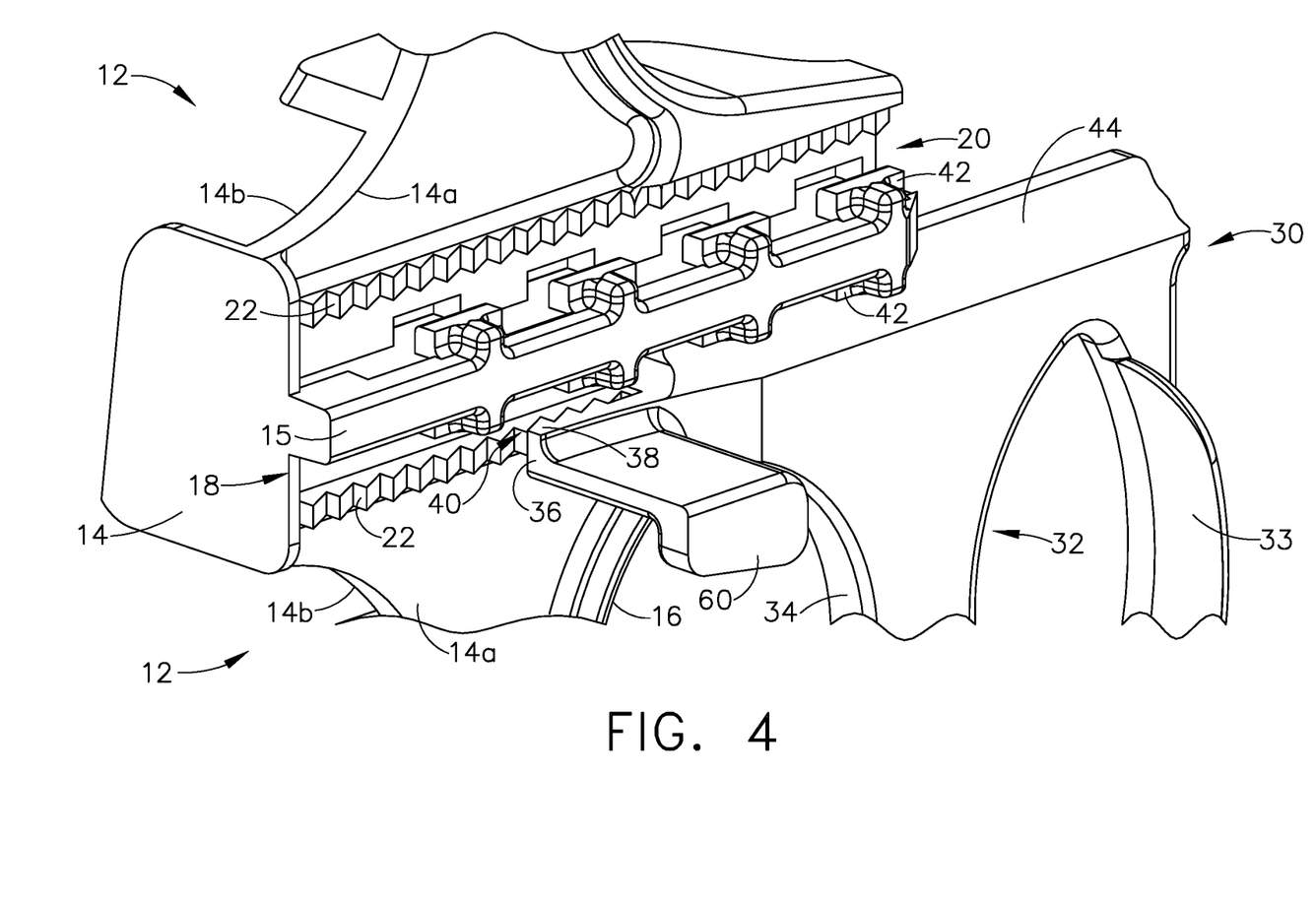
FIG. 4 is an enlarged perspective view of a portion of the cable retaining assembly shown in FIG. 2.

FIG. 4 is an enlarged perspective view of a portion of the cable retaining assembly 10 shown in FIG. 2 without an upper clip 30. The ratcheting strip 22 and the ratcheting teeth 38 form a ratchet locking mechanism when the protrusions 36 are slid within the set of channels 18, 20. The ratchet locking mechanism can provide two locking points 40 for each clip 30, one of which is illustrated in FIG. 4, and is configured to engage the clip 30 with the bracket 12. When the set of spaced protrusions 36 are located within the first and second channels 18 and 20, the ratcheting teeth 38 interlock with the ratcheting strip 22 and the two locking points 40 are formed within each of the first and second channels 18 and 20. The first side 14a of the bracket 12 can also be provided with retaining bumpers 42 spaced along the first and second channels 18 and 20. The retaining bumpers 42 can be fixed to the extended lower portion 14c (not shown in FIG. 4). The retaining bumpers 42 can also be fixed to a ridge 15 on the body 14.

Figure 5:
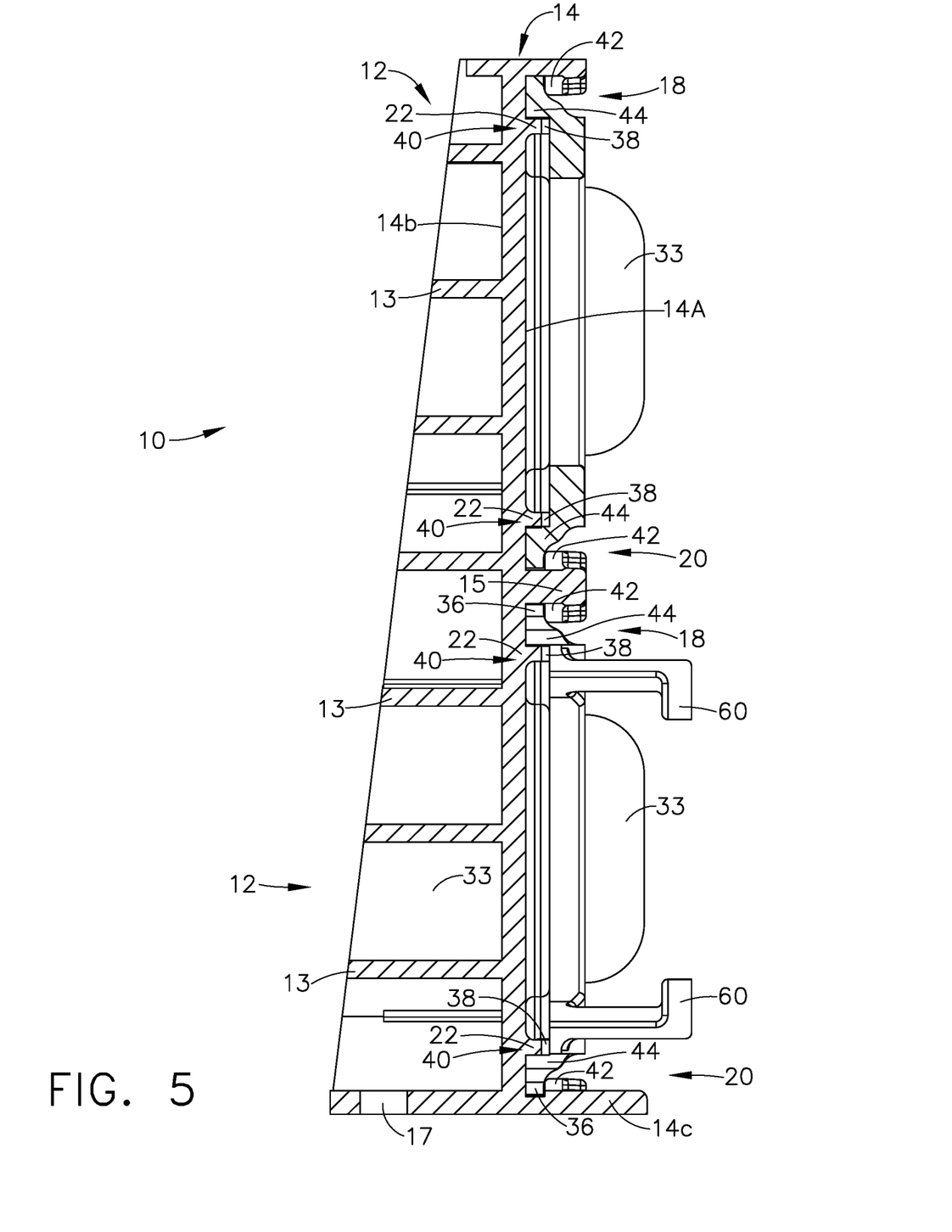
FIG. 5 is a cross-sectional view of the cable retaining assembly shown in FIG. 2 along line VI-VI and without the upper clip.

FIG. 5 illustrates the cross-section of the cable retaining assembly 10 as shown in FIG. 2 along line VI-VI. FIG. 5 better illustrates the fins 44 of the clip bodies 32 and the retaining bumpers 42. When the protrusions 36 are located within the first and second channels 18 and 20 the retaining bumpers 42 impede the fin 44 of the clip body 32 from horizontal movement so that the locking points 40 remain intact. The corresponding geometry of the ratcheting teeth and the ratcheting strip 22 allow the ratcheting teeth 38 and the ratcheting strip 22 to interlock, or fit together to form the locking points 40. Ribs 13 can be provided on the second side 14b of the bracket 12 body 14, and can reinforce the structure of the cable retaining assembly 10.

Figure 6:
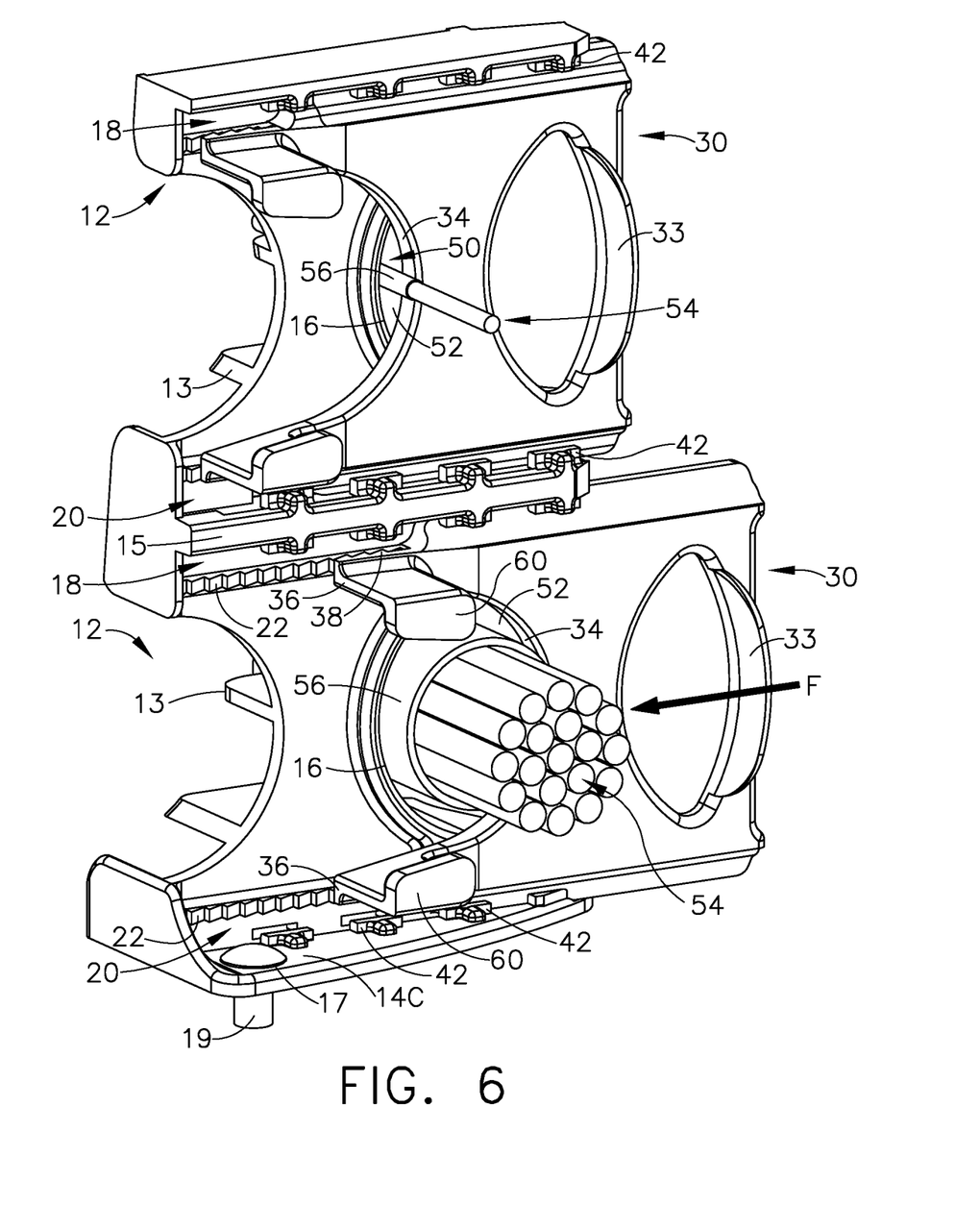
FIG. 6 is a perspective view of the cable retaining assembly shown in FIG. 2 in an engaged position with sets of cables.

FIG. 6 is a perspective the cable retaining assembly 10 having the clips 30 in differing positions. While the clip 30 is within the set of channels 18, 20 of the bracket 12 the first support face 16 and the second support face 34 define a raceway 50. The raceway 50 further defines a raceway opening 52. The area or size of the raceway opening 52 varies depending on the position of the clip 30 within the first and second channels 18 and 20. Hence, the raceway 50 can retain a set of cables 54 of various diameters and is configured to accommodate the set of cables 54. It is contemplated that the diameters of the set of cables 54 retainable within the raceway 50 can be in the range of 2 mm to 32 mm. An outer covering, or a sheath 56 can be provided on the set of cables 54 to envelope the set of cables 54 and keep the set of cables 54 together. The sheath 56 can be made of any suitable material such anti-abrasion tape. Furthermore, an exemplary fastener 19 has been illustrated as being located within the mounting opening 17 on the extended lower portion 14c of the bracket 12 body 14.

To assemble the cable retaining assembly 10, the clip 30 is engaged with the bracket 12. The cable retaining assembly 10 is configured such that the clip 30 is reusably engaged with the bracket 12 multiple times. Therefore, the cable retaining assembly 10 is reusable. As best seen in FIG. 6, to engage the clip 30 with the bracket 12 a user can align the clip 30 with the corresponding set of channels 18, 20 on the bracket 12 and push in a forward direction indicated by the arrow F via the projection 33 on the clip 30. A user can alternatively grasp the clip 30 and slide the set of protrusions 36 and fins 44 within the set of channels 18, 20 on the bracket 12 in the forward direction F. As the ratcheting teeth 38 pass over the ratcheting strip 22 the ratchet locking mechanism is formed and the clip 30 is engaged as ratcheting teeth 38 are configured to resist backward movement by interlocking with the ratcheting strip 22. Thus, the cable retaining assembly 10 is in an engaged position.

Figure 7:
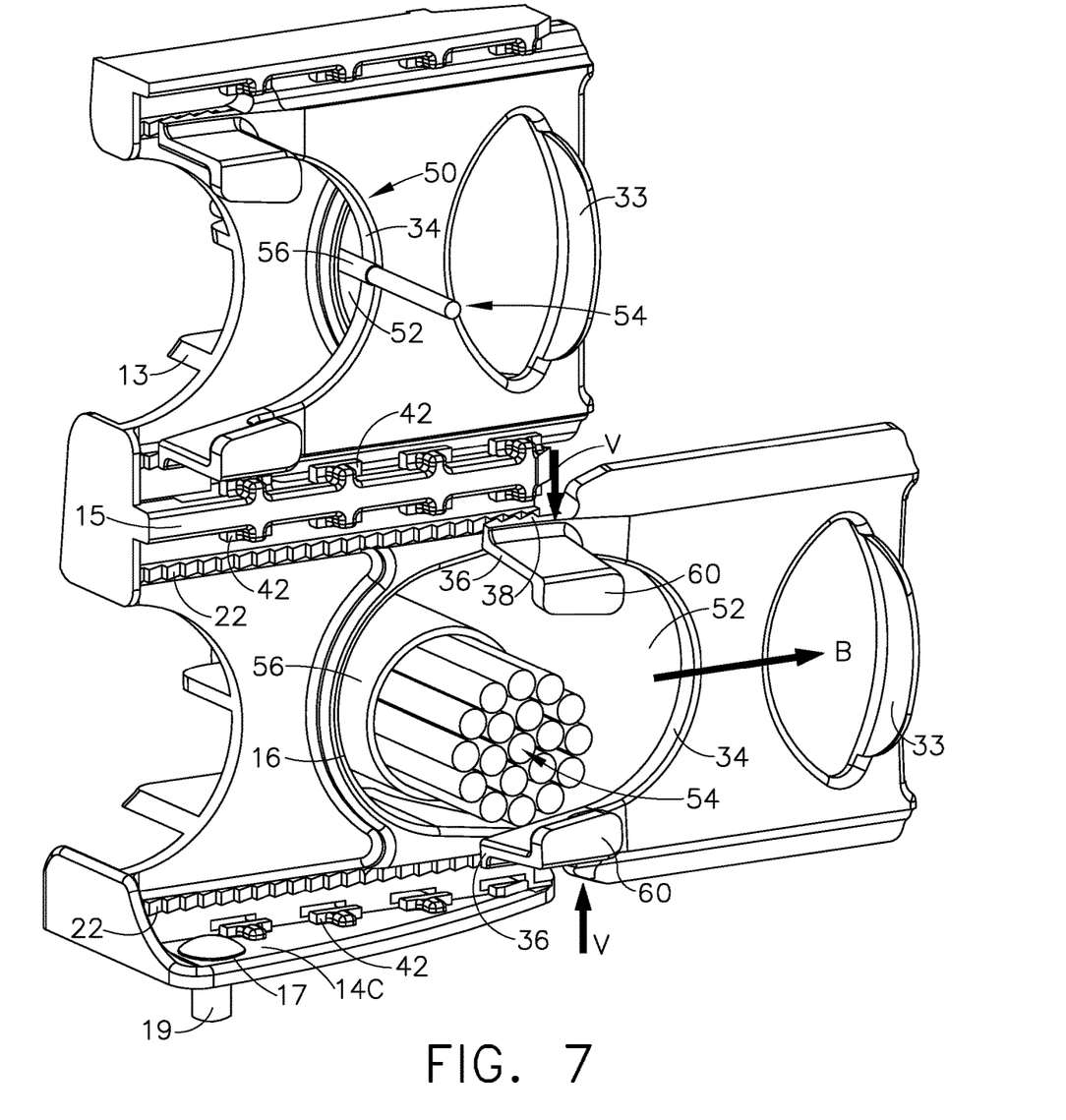
FIG. 7 is a perspective view of the cable retaining assembly shown in FIG. 6 in a released position.

As shown in FIG. 7, to disassemble the cable retaining assembly 10, the clip 30 is released from the bracket 12. In order to disengage the clip 30 from the bracket 12 the ratcheting teeth 38 need to be disengaged from the ratcheting strip 22. To disengage the ratcheting teeth 38 from the ratcheting strip 22 a user manipulates the tabs 60 to move the protrusions 36 and ratcheting teeth 38 away from the ratcheting strip 22 such that the geometries of the ratcheting teeth 38 and the ratcheting strip 22 do not interlock. To manipulate the tabs 60 the user can squeeze the set of tabs 60 by applying pressure to the set of tabs 60 as indicated by the vertical arrows V. When the set of tabs 60 are squeezed, the ratcheting teeth 38 are moved out of engagement with the ratcheting strip 22, which releases the locking points 40. While the user is squeezing the set of tabs 60 the clip 30 can then be slid in a backwards direction, as indicated by the arrow B, over the ratcheting strip 22 until the clip 30 is no longer retained within the bracket 12.

Figure 8:
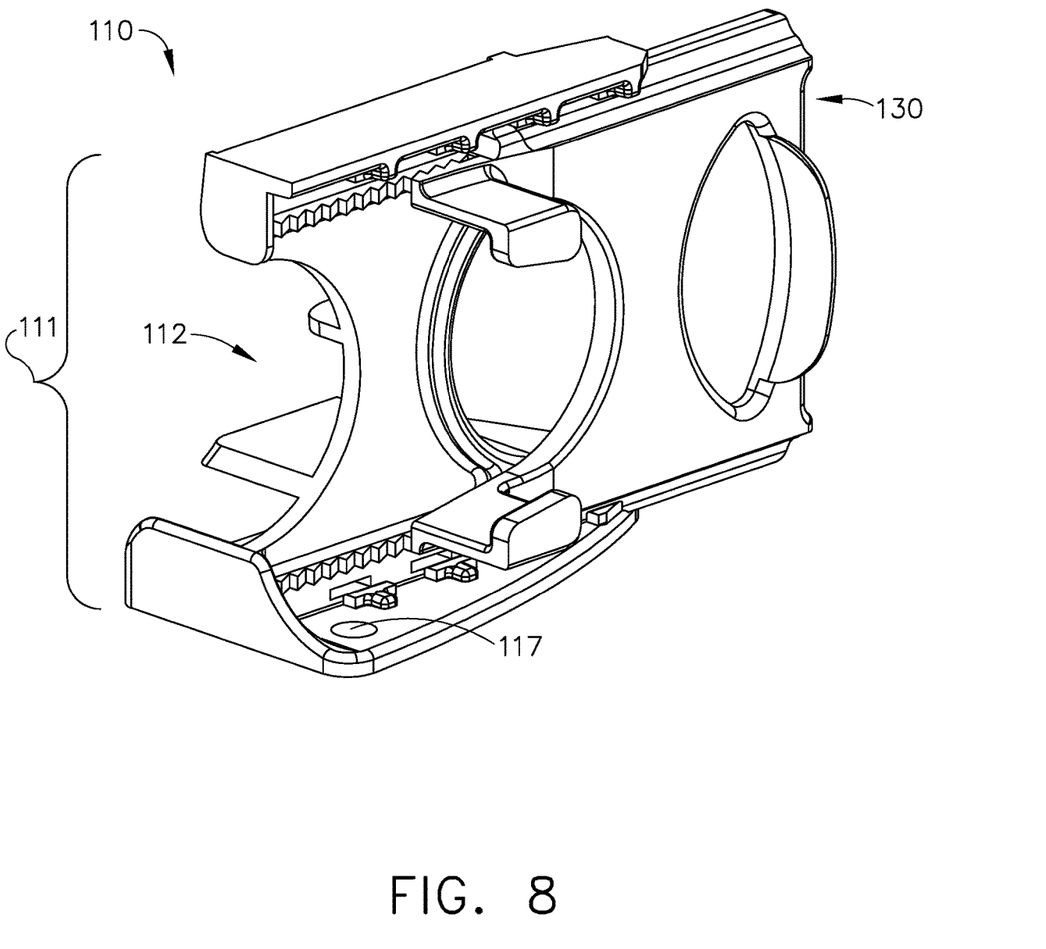
FIG. 8 is a perspective view of another exemplary cable retaining assembly in accordance with various aspects described herein.

FIG. 8 illustrates another exemplary cable retaining assembly 110 according to a second embodiment of the disclosure. The second embodiment is similar to the first embodiment; therefore, like parts will be identified with like numerals increased by 100, with it being understood that the description of the like parts of the first embodiment applies to the second embodiment, unless otherwise noted.

While the first embodiment, cable retaining assembly 10 in FIG. 2 is shown with two joined brackets 12, it is possible for the cable retaining assembly 10 to include any number of brackets. For example, the cable retaining assembly 10 can include only a single bracket 12, or more than two joined brackets 12. Therefore, the cable retaining assembly 10 can include one or more operably coupled cable retaining bodies 11. A difference between the first embodiment and the second embodiment is that the cable retaining assembly 110 includes only a single cable retaining body 111.

The electrical wiring system provides electrical energy to avionics of the aircraft via cables. Aspects of the above disclosure provide for a beneficial cable retaining assembly that provides for size adjustment to accommodate cable bundles of various diameters for avionics wiring, and allows for a set of cables to be secured without the use of a cable tie. Cable bundles would have previously been secured with the use of P-clamps or cable ties as required. While P-clamps are reusable, they are not size adjustable, and while cable ties are size adjustable, they are not reusable. The aspects of the present disclosure allow for both size adjustment and reusability, thus removing the need for P-clamps or cable ties.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cable retaining assembly, comprising:
   a bracket having a body with a first C-shaped support face defining a focus axis extending between axially opposing first and second sides of the bracket, a set of channels including a first channel positioned above the C-shaped support face and including a ratcheting strip therein and a second channel positioned below the C-shaped support face opposite the first channel and including a ratcheting strip therein, wherein the first channel ratcheting strip and the second channel ratcheting strip are on the first side of the bracket; and
   a clip having a body with a second C-shaped support face oriented opposite to the first C-shaped support face, a set of protrusions configured to slide within the set of channels and wherein the set of protrusions include ratcheting teeth, and a set of tabs adjacent the protrusions;
   wherein the ratcheting strip and ratcheting teeth form a ratchet locking mechanism configured to engage the clip with the bracket and when the clip is engaged with the bracket the first C-shaped support face and the second C-shaped support face define an ellipsoidal raceway enclosed by the first C-shaped support face and the second C-shaped support face, and configured to retain a set of cables, and wherein the set of tabs is configured to be compressed by a user to disengage the ratchet locking mechanism and to allow the clip to be released.

2. The cable retaining assembly of claim 1 wherein the ratchet locking mechanism provides two locking points.

3. The cable retaining assembly of claim 1 wherein the clip is configured to be reusably engaged with bracket multiple times.

4. The cable retaining assembly of claim 1 wherein the raceway is configured to accommodate a set of cables having diameters ranging from 2 mm to 32 mm.

5. The cable retaining assembly of claim 1 wherein the first support face and the second support face are curved.

6. The cable retaining assembly of claim 1 wherein the first support face extends along a portion of a vertical length of the body and the first and second channels are located above and below the first support face, respectively.

7. The cable retaining assembly of claim 6 wherein the body comprises a mounting portion adjacent to one of the first and second channels and the mounting portion comprises at least one opening configured to accommodate a fastener.

8. A cable retaining assembly, comprising:
   a set of cable retaining bodies, each cable retaining body comprising:
   a bracket having a body with a first C-shaped support face defining a focus axis extending between axially opposing first and second sides of the bracket and a set of channels including a first channel positioned above the C-shaped support face and including a ratcheting strip therein and a second channel positioned below the C-shaped support face opposite the first channel and including a ratcheting strip therein, wherein the first channel ratcheting strip and the second channel ratcheting strip are on the first side of the bracket; and
   a clip having a body with a second C-shaped support face oriented opposite to the first C-shaped support face, a set of protrusions configured to slide within the set of channels and wherein the set of protrusions include ratcheting teeth, and a set of tabs that are moveable between an engaged position and a released position;
   wherein the ratcheting strip and ratcheting teeth form a ratchet locking mechanism configured to engage the clip with the bracket and when the clip is engaged with the bracket the first C-shaped support face and the second C-shaped support face define an enclosed cable raceway configured to retain a set of cables;
   wherein the cable retaining body is modular and the set of cable retaining bodies are operably coupled; and
   wherein the released position of the set of tabs disengaged the teeth from the ratcheting strip to allow the clip to be released.

9. The cable retaining assembly of claim 8 wherein the first and second channels are located on opposite ends of the bracket.

10. The cable retaining assembly of claim 9 wherein the first support face extends along a portion of a vertical length of the body and the first and second channels are located above and below the first support face, respectively.

11. The cable retaining assembly of claim 10 wherein a lower portion of a first cable retaining body of the set of cable retaining bodies is operably coupled to an upper portion of a second cable retaining body of the set of cable retaining bodies.

12. The cable retaining assembly of claim 11 wherein the first cable retaining body and the second cable retaining body are operably coupled via an ultrasonic weld.

13. The cable retaining assembly of claim 8 wherein the clip is configured to be reusably engaged with bracket multiple times.

14. The cable retaining assembly of claim 8 wherein the set of cable retaining bodies is configured to secure the set of cables without use of a cable tie.

15. A cable retaining assembly, comprising:
a bracket having a generally planar body with a first side and a second side and a first C-shaped curved support face defining a focus axis extending between axially opposing first and second sides of the generally planar body, the first C-shaped curved support face extending between at least a portion of the first side and the second side and where the first side includes a set of first and second channels with the first and second channels including ratcheting strips;
a generally planar clip having a second C-shaped curved support face oriented opposite to the first C-shaped curved support face, and a ratchet locking mechanism comprising a set of spaced protrusions configured to slide within the set of channels parallel with the first side of the bracket body and having teeth configured to engage with the ratcheting strips, and a set of tabs that are moveable between an engaged position and a released position;
wherein when the set of spaced protrusions are located within the first and second channels two locking points are formed and an enclosed cable raceway is formed between the first C-shaped support face and the second C-shaped support face, and wherein the released position of the set of tabs disengaged the teeth from the ratcheting strip to allow the clip to be released such that the clip is configured to be reusably engaged with bracket multiple times.

16. The cable retaining assembly of claim 15 wherein the set of tabs are adjacent to the protrusions.

17. The cable retaining assembly of claim 15 wherein the cable raceway is configured to accommodate a set of cables having a diameter ranging from 2 mm to 32 mm.

18. The cable retaining assembly of claim 15 wherein the first support face extends along a portion of a vertical length of the body and the first and second channels are located above and below the first support face, respectively.

* * * * *